United States Patent
Gai et al.

(10) Patent No.: US 11,009,942 B2
(45) Date of Patent: May 18, 2021

(54) MULTI-HUMAN TRACKING SYSTEM AND METHOD WITH SINGLE KINECT FOR SUPPORTING MOBILE VIRTUAL REALITY APPLICATION

(71) Applicant: SHANDONG UNIVERSITY, Shandong (CN)

(72) Inventors: Wei Gai, Jinan (CN); Chenglei Yang, Jinan (CN); Mingda Dong, Jinan (CN); Hao Liu, Jinan (CN); Shijun Liu, Jinan (CN); Yulong Bian, Jinan (CN); Juan Liu, Jinan (CN); Xiangxu Meng, Jinan (CN); Yuqiu Wang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 215 days.

(21) Appl. No.: 15/856,952

(22) Filed: Dec. 28, 2017

(65) Prior Publication Data
US 2019/0004597 A1    Jan. 3, 2019

(30) Foreign Application Priority Data

Jun. 28, 2017  (CN) .......................... 201710508204.X

(51) Int. Cl.
| | | |
|---|---|---|
| *G06F 3/01* | (2006.01) | |
| *G06T 7/73* | (2017.01) | |
| *G06T 7/246* | (2017.01) | |
| *A63F 13/213* | (2014.01) | |
| *A63F 13/843* | (2014.01) | |

(Continued)

(52) U.S. Cl.
CPC ............ *G06F 3/012* (2013.01); *A63F 13/211* (2014.09); *A63F 13/213* (2014.09); *A63F 13/25* (2014.09); *A63F 13/26* (2014.09); *A63F 13/428* (2014.09); *A63F 13/49* (2014.09); *A63F 13/5258* (2014.09); *A63F 13/843* (2014.09); *A63F 13/92* (2014.09); *G06T 7/248* (2017.01); *G06T 7/254* (2017.01); *G06T 7/74* (2017.01); *H04N 13/344* (2018.05); *H04N 13/366* (2018.05); *A63F 2300/8082* (2013.01); *G01C 19/00* (2013.01); *G06T 5/50* (2013.01); *G06T 2207/10024* (2013.01); *G06T 2207/10028* (2013.01);

(Continued)

(58) Field of Classification Search
CPC ...................................................... G06F 3/012
See application file for complete search history.

(56) References Cited

U.S. PATENT DOCUMENTS

| | | | | |
|---|---|---|---|---|
| 9,286,711 | B2 * | 3/2016 | Geisner | ................. G06T 19/006 |
| 2012/0327116 | A1 * | 12/2012 | Liu | .................... G02B 27/0093 345/633 |

(Continued)

*Primary Examiner* — Hyun D Park
(74) *Attorney, Agent, or Firm* — Oliff PLC

(57) ABSTRACT

The invention discloses a multi-human tracking system and method with single Kinect for supporting mobile virtual reality applications. The system can complete the real-time tracking of users occluded in different degrees with a single Kinect capture device to ensure smooth and immersive experience of players. The method utilizes the principle that the user's shadow is not occluded when the user is occluded under certain lighting conditions, and converts the calculation of the motion of the occluded user into a problem of solving the movement of the user's shadow, and can accurately detect the position of each user, rather than just predicting the user's position, thereby actually realizing tracking.

9 Claims, 4 Drawing Sheets

(51) Int. Cl.
    *A63F 13/211* (2014.01)
    *A63F 13/25* (2014.01)
    *A63F 13/49* (2014.01)
    *A63F 13/92* (2014.01)
    *A63F 13/5258* (2014.01)
    *A63F 13/428* (2014.01)
    *H04N 13/344* (2018.01)
    *H04N 13/366* (2018.01)
    *A63F 13/26* (2014.01)
    *G06T 7/254* (2017.01)
    *G01C 19/00* (2013.01)
    *G06T 5/50* (2006.01)

(52) U.S. Cl.
    CPC ........... *G06T 2207/20224* (2013.01); *G06T 2207/30196* (2013.01); *H04N 2213/008* (2013.01)

(56) References Cited

U.S. PATENT DOCUMENTS

| | | | | |
|---|---|---|---|---|
| 2013/0330088 A1* | 12/2013 | Oshima | ............ | H04B 10/11 |
| | | | | 398/130 |
| 2014/0267400 A1* | 9/2014 | Mabbutt | ............ | G06T 19/006 |
| | | | | 345/633 |
| 2017/0104982 A1* | 4/2017 | Weinstock | ......... | H04N 13/128 |
| 2017/0312614 A1* | 11/2017 | Tran | .................. | H04W 4/027 |

* cited by examiner

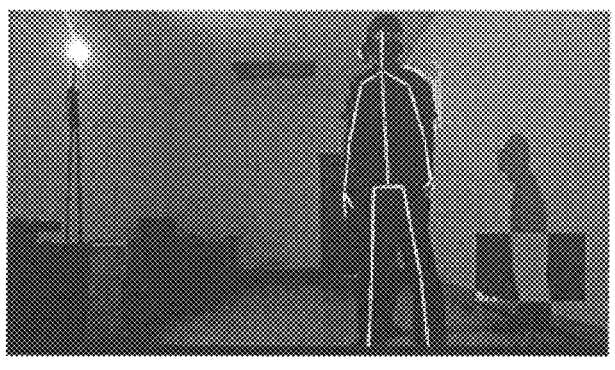
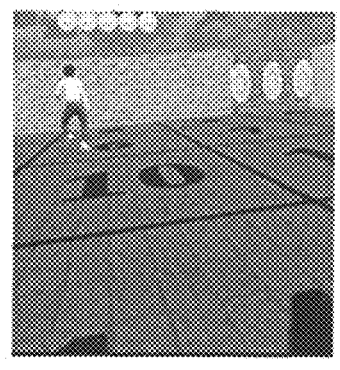
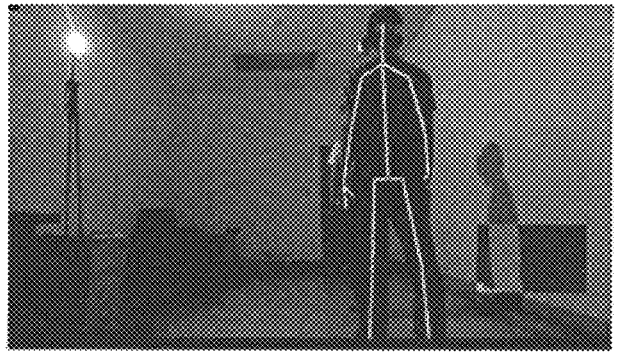
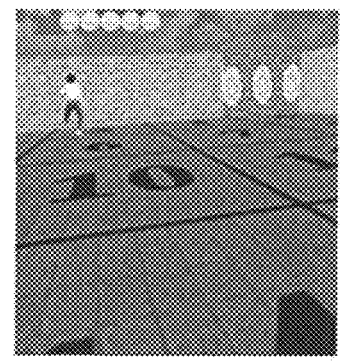
Fig. 4 (a)                    Fig. 4 (b)

MULTI-HUMAN TRACKING SYSTEM AND METHOD WITH SINGLE KINECT FOR SUPPORTING MOBILE VIRTUAL REALITY APPLICATION

FIELD OF THE INVENTION

The present invention relates to a multi-human tracking system and method with single Kinect for supporting mobile virtual reality applications.

BACKGROUND OF THE INVENTION

As one of the key issues based on the mobile virtual reality device experience, position tracking captures the user's position and orientation in the physical space, and also ensures the spatial consistency between the true feeling of the user in movement and the images seen in the virtual device.

Nowadays, the positioning techniques that can be used in mobile VR are listed as follows:

(1) Global positioning system (GPS) method, which is a widely used satellite positioning system with the largest coverage. However, when the GPS signal is weak and thus occluded by the disturbed buildings, leaves and the area including the indoor area, this system will not work normally. Furthermore, GPS cannot be deployed indoors, because line-of-sight transmission cannot happen in the indoor environment between the receiver and the satellite.

(2) Indoor positioning system (IPS), mainly including IPS based on the WIFI signals, based on radio signals, based on ultrasound and based on infrared. This type of positioning sensor requires a permanent electronic infrastructure to facilitate measurement, and objects depending on such an infrastructure also need special sensors or actuators.

(3) Visual-based tracking methods, such as stereo cameras and time-of-flight (TOF) cameras. Kinect is a revolutionary depth camera, whose cost is much lower than the traditional 3D camera. It uses the TOF (time-of-flight) calculation method to obtain the phase difference from the light emitted by a sensor after the reflection of the object, thus the distance value between the equipment and the actual scene can be obtained, namely, the depth value. The resulting depth image can be used not only to determine the position of the object relative to the somatosensory device, but also to further obtain the point cloud data of the object, and even the skeletal information of the role.

At the same time, occlusion is an important problem that cannot be overlooked in the multi-user tracking system. That is to say, how to identify the user's position when the user is occluded for a long time without affecting the user's immersive experience? Most of the current methods use the detection model to detect the user, and then track the user. However, the existing methods cannot effectively track users who are severely occluded or even fully occluded.

SUMMARY OF THE INVENTION

In order to solve the above problems, the present invention proposes a multi-human tracking system and method with single Kinect for supporting mobile virtual reality applications.

The first objective of the present invention is to propose a multi-human tracking system with single Kinect for supporting mobile virtual reality applications. The system can complete the real-time tracking of users occluded in different degrees with a single Kinect capture device to ensure smooth and immersive experience of players.

The second objective of the present invention is to provide a detection method of an occluded object which incorporates multi-sensing data clues. The method utilizes the principle that the user's shadow is not occluded when the user is occluded under certain lighting conditions, and converts the calculation of the motion of the occluded user into a problem of solving the movement of the user's shadow, and can accurately detect the position of each user, rather than just predicting the user's position, thereby actually realizing tracking.

In order to achieve the above objectives, the present invention uses the following technical scheme:

A multi-human tracking system with single Kinect for supporting mobile virtual reality applications, including a tracking subsystem and an experience subsystem, wherein:

the tracking subsystem includes an image capture module, a terminal sensor information capturing module, a current state judgment module, a positioning realizing module and a virtual-or-real position mapping module:

the image capturing module is configured to acquire the user's color image information and identify the skeletal data through the somatosensory camera Kinect to provide the input data for the current state judgment module;

the terminal sensor information capturing module acquires the rotation information of the mobile phone gyroscope in order to obtain the user's orientation information;

the current state judging module judges whether an occluding state exists and the occluding state according to the quantity acquired by the image capturing module in the continuous sampling time;

the positioning realizing module receives the current state judgment result and determines the calculation of the realization position of the tracking algorithm corresponding to the occluding state;

the virtual-or-real position mapping module is used for mapping the calculated physical coordinates to the virtual space coordinates to ensure the spatial consistency between the true feeling of the user in movement and the image seen in the virtual device;

The experience subsystem includes a stereoscopic display module and an interactive module of a virtual space, and the stereoscopic display module exhibits a three-dimensional sense by the virtual reality glasses. Then according to the captured head rotation and the position of the user obtained by the virtual-or-real position mapping module, the user's field of view (FOV) and viewpoints are tracked, to determine the current field of view (FOV) of the target, the position and orientation of the viewpoints.

A single-Kinect-based multi-user tracking method that supports mobile virtual reality games includes the following steps:

(1) opening the Kinect capture device, recording the background image information, and connecting the terminal with the capture device;

(2) assuming that the number of users participating in the initialization scene is $N_k$, the current time $k=1$, whether or not occluding happens in the system Tag Occ=0;

(3) if $k=1$, then jumping to step (8), otherwise jumping to step (4);

(4) calculating the number of users $N_k$, that Kinect can identify currently, and recording the rotation angle of the terminal gyroscope;

(5) judging the current state of the system according to the number of users identified at the adjacent time, if $N_k=N_{k-1}$, jumping to step (6), otherwise jumping to step (7);

(6) according to the tag of occluding Occ, judging the state of the system, if Occ=0, then the system is in a non-occluding state, calling the non-occluding method to calculate the user's position, then jumping to step (8); otherwise, the system is in the state of continuous occluding, then calling the continuous occluding state method to calculate the position of the user, and jumping to step (8);

(7) if $N_k<N_{k-1}$, then the system is in the occluding appearing state, calling a occluding-appearing state method to calculate the position of the user and setting Occ=1, jumping to step (8); otherwise the system is in the occluding disappearing state, calling the occluding-disappearing state method to calculate the position of the user and setting Occ=0, jumping to step (8);

(8) mapping the calculated user's position to the virtual space coordinates to ensure the spatial consistency between the real feeling of the user in movement and the image seen in the virtual device;

(9) according to the user's position and the rotation angle of terminal gyroscope got from (8), rendering the user's field of view and viewpoint, and realizing immersive experience through virtual reality glasses;

(10) adding one to k;

(11) determining whether the game is over, if so, finishing the game, otherwise jumping to step (3).

In step (6), the user's position calculation method when the system is in a non-occluding state includes the following steps:

(6-1) according to the skeleton information provided by Kinect, recording the user's position information and the corresponding user's ID information; and (6-2) according to the ID of each user's information, updating in real time the corresponding user's position.

In step (6), the user's position calculation method used when the system is in a continuous occluding state is designed from the perspective of using the user's shadow, using the movement of the shadow instead of the movement of the occluded user, fusing the skeleton information, color image user shadow information and sensor data obtained by Kinect to compute the occluded user's position, specifically including the following steps:

We assume the occluded user at time k, as $p^j$ and the user who occludes $p^j$ as $p^i$, so we can determine the search rectangular area around $P^{j}$'s shadow according to the position of $p^i$ and light source obtained by Kinect and the physical relationship between $p^i$ and $p^j$, then we calculate the difference between the foot position of the user and the starting position of the shadow search box. The real-time color image captured by Kinect subtracts the acquired background image to obtain the silhouette of the shadow of the user. Then according to the user's shadow silhouette, the center position of the shadow is calculated; according to gyro sensor data, the movement direction of the occluded user $P^j$ is judged; according to the change in the shadow position of the adjacent frame, whether the occluded user has moved is judged, and then the occluded user's position can be determined.

Further, depending on the position of the user $p^i$ and the light source, the size of the search rectangular box is also changed in real time.

Further, if the difference is greater than the preset threshold, the generated image is considered to be a foreground image and marked as black; if the difference is not greater than the preset threshold, there is no user shadow in the search area.

The method of calculating the user's position used when the system is in the occluding-appearing state in step (7) includes the following steps: assuming that the user's ID information detected at time k is curID, the user number information set UID at k−1 is detected, the occluded user is searched, and the movement direction of the occluded user $P^j$ is judged according to the gyro sensor data, and the position of the occluded user at time k is calculated in combination with the movement direction and the motion amplitude.

The user's position calculation method mentioned in step (7) when the system is in the occluding-disappearing state includes the following steps:

(7-2-1) Different position calculation methods are selected according to the user's occluded mark. If the user is not occluded, then jumping to step (7-2-2); if the user appears again after the occluding, then jumping to step (7-2-3);

(7-2-2) According to the number of each user information, updating in real the corresponding user's position;

(7-2-3) Updating the number and position information after the user reappears.

In step (8) the calculated user's position is mapped to virtual space coordinates, specifically including the following steps:

(8-1) After Kinect is arranged, marking the tracking area and measuring the four corner positions of the tracking area;

(8-2) According to the position of four corner points in the virtual space, calculating the transformation matrix M of the Kinect space coordinate system relative to the virtual scene coordinate system.

(8-3) Assuming that at current time k, the position of user j is $(posx_k^j, posz_k^j)$, the corresponding position of the user in the virtual scene is $(vposx_k^j, vposz_k^j)=(posx_k^j, posz_k^j)*M$.

In step (9), the mobile phone is placed in the virtual reality glasses, and the user can see the three-dimensional scene by the virtual reality glasses. According to the users head rotation captured by the mobile phone sensor information capturing module, the user's position obtained by the virtual-or-real position mapping module, the tracking of users field of view and point of view is completed to determine the target in the current field of view, and the user's point of view and orientation.

Compared with the prior art, the present invention has the following advantages:

(1) A method for detecting an occluded user that incorporates a multi-sensing data cue is proposed for the occluding continuous state. Under certain lighting conditions, when a certain user is occluded, the user's shadow will not be occluded. Based on this, calculating the motion of the occluded user is transformed into the problem of solving the shadow movement of the user. This method incorporates various types of information, such as mobile phone gyroscope data, Kinect color, image information, depth image information to compensate the missing data caused by occluding;

(2) The present invention calculates the position information of the occluded user by establishing the motion model and the direction model of the user's shadow. Compared with the previous methods, it can detect and calculate the position of seriously or even fully occluded user, rather than just predict the user's position;

(3) Considering the application of mobile virtual reality, the present invention proposes a method with a single Kinect, which is of simple adjustment, low cost and simple deployment to solve the problem of multi-user (no more than 6 people) occluding, to ensure the smooth and immersive experience of players;

(4) In addition to the wide range of applications in the field of game entertainment, the invention can also be applied to education, fireman training and other fields.

BRIEF DESCRIPTION OF THE DRAWINGS

The accompanying drawings that form a part of the present application are to provide a further understanding of the present application. The illustrative embodiments and illustrations of the present application are intended to be illustrative of the present application and will not constitute an improper limit of the present application

FIG. 4(a) and FIG. 4(b) are examples of the present invention used for a double-person virtual reality maze game.

DETAILED DESCRIPTION OF THE EMBODIMENTS

Figure 1:
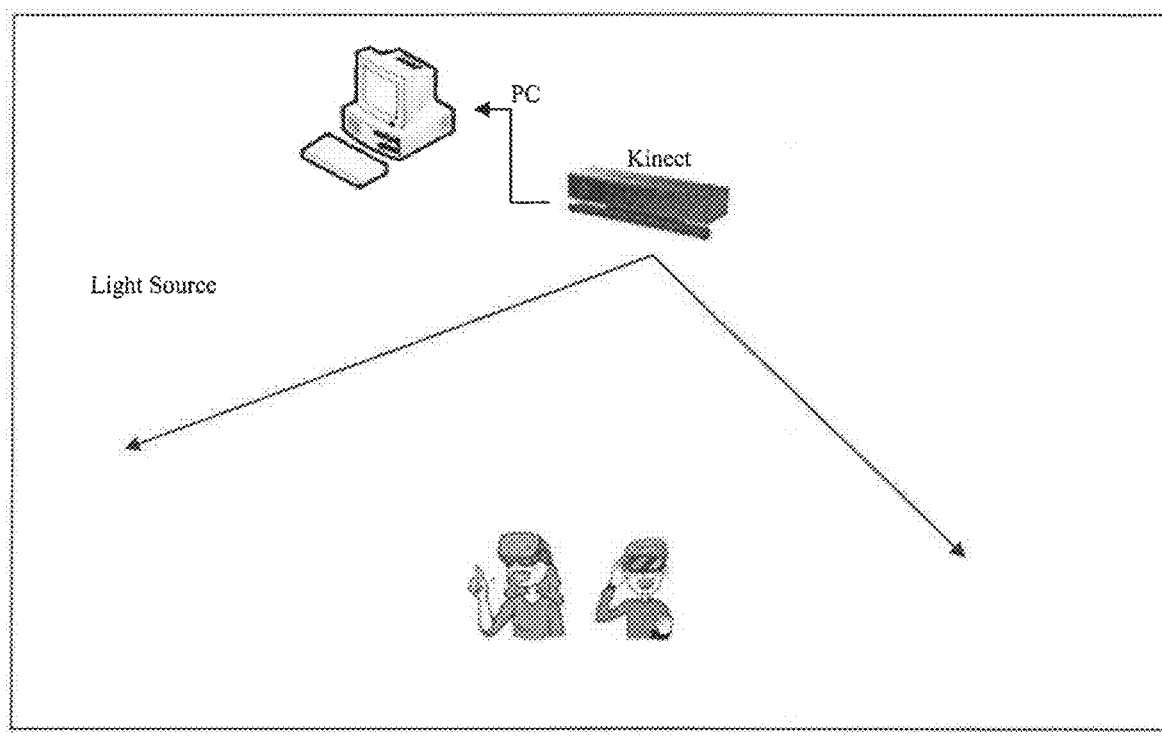
FIG. 1 is a hardware structural diagram of the present invention.

The invention will now be further described with reference to the accompanying drawings and embodiments.

It should be noted that, the following detailed description is illustrative and is intended to provide further description of the present application, and unless otherwise indicated, all the technical and scientific terms used herein have the same meaning as commonly understood by those of ordinary skill in the corresponding field.

It should be noted that the terminology used herein is for the purpose of describing the specific implementation only and is not intended to limit the exemplary embodiments according to the present application. As used herein, unless the context clearly dictates otherwise, the singular forms are intended to include the plural. In addition, it should be understood that, when terms "comprise" and/or "include" are used in the description, they indicate the existence of features, steps, operations, equipment, components and/or the combination thereof.

As described in the background art, most present methods use the user detection model to detect the user and then track the user. But for the seriously or even fully occluded user, effective tracking cannot be realized. In order to solve the technical problem above, the present application proposes a single Kinect-based multi-user tracking system which supports mobile virtual reality application, and designs an occluding-handling method which integrates multi-sensing data clues to process the occluding, and track in real time the position of users who are occluded in different degrees. The method can be divided into four levels:

The first level, information acquisition layer. According to the input information, acquiring the number of users, user skeletal data, gyroscope data and user shadow information.

The second level, the information analysis layer. Judging the existing state of the system according to the information obtained. The present invention divides the system state into four categories: non-occluding state, the occluding-appearing state, the occluding-continuing state, the occluding-disappearing state.

The third level, the decision-making selection layer is used to design the different tracking methods according to the above-mentioned four kinds of system states, and the different tracking methods are invoked according to the different states of the system.

The fourth level, application layer. Based on the multi-clue decision fusion method, the position calculation of users who are occluded in different degrees is realized, and the obtained physical coordinates of the user are mapped to the virtual space coordinates to ensure the consistency of the user's real feeling in movement and the image seen in the virtual device.

The method incorporates various types of information, such as mobile phone gyroscope data, color image information, depth image information, to compensate the lack of data caused by occluding. For the occluding-continuing state, the present invention proposes a new detection model based on the shadow of the user. Under certain lighting conditions, when the user is occluded, the user's shadow will not be occluded. Based on this, we will convert solving the occluding of the user's movement into a solution to calculate the movement of the user's shadow. The position information of the occluded user is calculated by establishing a motion model and a direction model of the occluded user's shadow, which can detect and calculate the user's position where the occluding occurs seriously, rather than estimating the user's position, as compared to the previous method.

A multi-human tracking system and method with single Kinect for supporting mobile virtual reality applications is proposed, wherein the system includes a user tracking subsystem and a user experience subsystem. The user tracking subsystem includes a user image capture module, a terminal sensor information capture module, a system current state judgment module, a positioning realizing module and a virtual-or-real position mapping module; the user experience subsystem includes a three-dimensional display module and an interactive module interacted with the virtual space.

The user image capturing module is used for acquiring the user's color image information and the identified user skeletal data by the somatosensory camera Kinect, and providing input data for the system current state judgment module;

The terminal sensor information capturing module obtains the rotation information of the mobile phone gyroscope so as to obtain the user's orientation information and provide the input data for the user positioning realizing module and the stereoscopic display module;

The system current state judgment module judges the status of the current system by using the information provided by the user image capturing module and determining the state of the current system referring to the number of users identified at two adjacent moments: the non-occluding state, the occluding-appearing state, the occluding-continuing state, the occluding-disappearing state, to provide the basis for the positioning realizing module;

The positioning realizing module realizes the calculation of the user's position by selecting different tracking algorithms according to the current state of the system;

The virtual-or-real position mapping module is used to map the physical coordinates of the user calculated by the user realizing module to the virtual space coordinates to ensure the spatial consistency between the real feeling of the user movement and the image seen in the virtual device;

Through the three-dimensional display module, the user sees things showing a three-dimensional sense through the headset virtual reality glasses. Then according to the captured head rotation captured by mobile phone sensor information capture module and the position of the user obtained by the virtual-or-real position mapping module, the user's field of view (FOV) and viewpoints are tracked, to determine the current field of view (FOV) of the target, and the position and orientation of the viewpoints.

The interactive module interacted with the virtual space realizes the interaction between the user and the virtual object, determines the instruction issued to the virtual object, explains it and gives the corresponding feedback result, and presents the virtual world scene to the user through the virtual reality glasses.

A single-Kinect-based multi-user tracking method that supports mobile virtual reality games includes the following steps:

(1) opening the Kinect capture device, recording the background image information, and connecting the terminal with the capture device;

(2) assuming that the number of users participating in the initialization scene is $N_k$, the current time k=1, whether or not occluding happens in the system Tag Occ=0;

(3) if k=1, then jumping to step (8), otherwise jumping to step (4);

(4) calculating the number of users $N_k$ that Kinect can identify currently, and recording the rotation angle of the terminal gyroscope;

(5) judging the current state of the system according to the number of users identified at the adjacent time, if $N_k=N_{k-1}$, jumping to step (6), otherwise jumping to step (7);

(6) according to the tag of occluding Occ, judging the state of the system, if Occ=0, then the system is in a non-occluding state, calling the non-occluding method to calculate the user's position, then jumping to step (8); otherwise, the system is in the state of continuous occluding, then calling the continuous occluding state method to calculate the position of the user, and jumping to step (8);

(7) if $N_k<N_{k-1}$, then the system is in the occluding appearing state, calling a occluding-appearing state method to calculate the position of the user and setting Occ=1, jumping to step (8); otherwise the system is in the occluding disappearing state, calling the occluding-disappearing state method to calculate the position of the user and setting Occ=0, jumping to step (8);

(8) mapping the calculated user's position to the virtual space coordinates to ensure the spatial consistency between the real feeling of the user in movement and the image seen in the virtual device;

(9) according to the user's position and the rotation angle of terminal gyroscope got from (8), rendering the user's field of view and viewpoint, and realizing immersive experience through virtual reality glasses;

(10) adding one to k;

(11) determining whether the game is over, if so, finishing the game, otherwise jumping to step (3).

The user position calculation method used in step (6) when the system is in a non-occluding state includes the following steps:

(6-1-1) Initialization phase. According to the skeleton information provided by the Kinect SDK, recording the user position information $P_k=\{p_k^i|i=1, 2, \ldots, Nu\}$, and the corresponding user number ID $UID=\{uID^i|i=1, 2, \ldots Nu\}$. Where $p_k^j$ represents the position information of the i-th user at k moment, $uID^i$ represents the ID of the user i, and Nu represents the number of users at the existing moment.

(6-1-2) According to the ID of each user, updating in real time the corresponding user's position. Assuming that the ID of the user i is u currently, the position is pos, if $u=uID^j(j=1, 2, \ldots Nu)$, then $p_k^j=pos$.

In step (6), in the user's position calculation method used when the system is in a occluding-continuing state, a tracking method is designed from the perspective of using the user's shadow, using the movement of the shadow instead of the movement of the occluded user, the integration and calculation of Kinect obtained skeleton information, color image user shadow information and sensor data (gyroscope data) to complete the occluded user's position. The method specifically includes the following steps:

Assuming that the occluded user is $p^j$ at time k, and the user occluding $p^j$ is $p^i$.

(6-2-1) According to the position of the user $p^i$ obtained by Kinect, the position of the light source, and the physical relationship between $p^i$ and $p^j$, the search rectangle area of the user $P^j$'s shadow is determined, and the rectangular area's length is h and the width is w.

We assign the point P ($posfx^j$, $posfz^j$) as the foot of $P^j$, and the point B (possx, possz) represents the beginning point of the shadow-searching area. Then we have:

$$possx = posfx^j + disx$$

$$possz = posfz^j + disz$$

Wherein (disx, disz) represents the relative positional relationship between points A and B, disz=0, $$disx = \begin{cases} 120 & posx^i < \delta \\ 100 & posx^i \geq \delta \end{cases}$$

According to the difference of position between the user $p^i$ and the light source, disx is of a different value, $\delta=0.0$. Wherein ($posx^i$, $posz^i$) represents the position information of user $p^i$.

In addition, depending on the difference of position of the user $P^i$ and the light source, the size of the search rectangular box is also changed in real time.

$$\begin{cases} h=400, w=450 & posx^i < \delta \\ h=400, w=320 & posx^i \geq \delta \end{cases}$$

(6-2-2) the color images captured by Kinect in real time are subtracted by the background image to get the shadow of the occluded user. If the difference is greater than the preset threshold, the generated image is considered to be a foreground image and marked as black. If the difference is not greater than the pre-set threshold, then there is no user shadow in the search area. Calculate the center position of the shadow based on the resulting shadow of the user's shadow cPos(cposx,cposz):

$$cposx = \frac{\sum C \cdot x}{|C|}$$

$$cposz = \frac{\sum C \cdot z}{|C|}$$

Wherein C represents the set of points that belong to the shadow.

(6-2-3) Determine the movement of the occluded user $P^j$'s direction according to the mobile phone gyro sensor data:

$$a = \begin{cases} 1 & O_j \in (t1, t2) \\ -1 & O_j \in (t3, t4), \\ 0 & \text{others} \end{cases}$$

$$b = \begin{cases} 1 & O_j \in (t5, t6) \cup (t7, t8) \\ -1 & O_j \in (t9, t10) \\ 0 & \text{others} \end{cases}$$

a, b is the movement mark of the user from the front to the rear and from the left to the right. Among them, the parameters t1, t2, t3, t4, t5, t6, t7, t8, t9, t10 are the reference values of mobile phone gyroscope rotation directions we set, t1=70, t2=110, t3=70, t4=110, t5=0, t6=20, t7=320, t8=360, t9=160, t10=200. The user's movement direction is divided into front, rear, left and right directions, when the user gyroscope data belongs to a range of motion, we think that the user moves towards one direction.

(6-2-4) Determine whether the occluded user is moving according to the shadow position changes of the adjacent frame:

$$fmx_k = \begin{cases} 1 & |cposx_k - cposx_{k-k_0}| > \theta_1 \\ 0 & \text{others} \end{cases}$$

$$fmz_k = \begin{cases} 1 & |cposz_k - cposz_{k-k_0}| > \theta_2 \\ 0 & \text{others} \end{cases}$$

$fmx_k$, $fmz_k$ indicate the motion mark of the user's shadow. Wherein ($cposx_k$, $cposz_k$), ($cposx_{k-k_0}$, $cposz_{k-k_0}$) represent the occluded user's shadow at k time, k–$k_0$ time position information, $k_0$=10, $\theta_1$=3, $\theta_2$=6.

(6-2-5) Calculate the position of the occluded user:

$$posx_k^j = posx_{k-1}^j + fmx_k * a * S$$

$$posz_k^j = posz_{k-1}^j + fmz_k * b * S$$

($posx_k^j$, $posz_k^j$) is the position of the occluded user at the time k, S is the user's movement stride, S=0.01.

The user position calculation method used in step (7) when the system is in the occluding-appearing state includes the following steps:

(7-1-1) Assume that the user ID information detected at time k is curID, the user ID information set UID at k−1 is searched for the occluded user. If uID$^j \in$ UID &uID$^j \notin$ curID(j=1, 2, ... Nu), then the occluded user is p$^j$, his ID is uID$^j$, and the occluding mark f$^j$=1.

(7-1-2) Determine the movement of the user P$^j$ direction according to the mobile phone gyro sensor data:

$$a = \begin{cases} 1 & O_j \in (t1, t2) \\ -1 & O_j \in (t3, t4), \\ 0 & \text{others} \end{cases}$$

$$b = \begin{cases} 1 & O_j \in (t5, t6) \cup (t7, t8) \\ -1 & O_j \in (t9, t10) \\ 0 & \text{others} \end{cases}$$

a, b are the movement marks of the user from the front to the rear and from the left to the right. Among them, the parameters t1, t2, t3, t4, t5, t6, t7, t8, t9, t10 are the reference values of mobile phone gyroscope rotation direction we set, t1=70, t2=110, t3=70, t4=110, t6=20, t8=360, t9=160, t10=200. The user's movement direction is divided into front, rear, left and right directions, when the user gyroscope data belongs to a range of motion, we think that the user moves towards a certain direction.

(7-1-3) Calculate the position at which the user k is occluded ($posx_k^j$, $posz_k^j$):

$$posx_k^j = posx_{k-1}^j + fmx_k * a * S$$

$$posz_k^j = posz_{k-1}^j + fmz_k * b * S$$

And set the mask occurrence marker Occ=1. S represents the user's movement stride, S=0.01.

The user position calculation method used in step (7) when the system is in the occluding-disappearing state includes the following steps:

(7-2-1) Different position calculation methods are selected according to the user's occluding mark. If the user is occluded, then f$^j$=0, if the user is not occluded, then jump to step (7-2-2); if the user is occluded then f$^j$=1, then the user appears again after the occluding, then jump to step (7-2-3);

(7-2-2) According to the number of each user information, update in real time the corresponding user's position. Assume that the ID of the current user i is u, the position is pos, if u=uID$^j$(j=1, 2, ... Nu), then $p_k^j$=pos.

(7-2-3) Update the ID and position information after the user reappears. Assume that the ID information after the user is reoccupied is v, the position is apps, then uID$^i$=v, $p_k^i$=apos. At the same time, f$^j$=0, Occ=0, mark occluding has disappeared.

Step (8) map the calculated user position to the virtual space coordinates, including the following steps:

(8-1) After Kinect is arranged, mark the tracking area and measure the four corner positions of the tracking area.

(8-2) According to the position of four corner points in the virtual scene space, the transformation matrix M of the Kinect space coordinate system relative to the virtual scene coordinate system is calculated.

(8-3) Assume at the current time k, the position of user j is ($posx_k^j$, $posz_k^j$), the corresponding position of the user in the virtual scene is ($vposx_k^j$, $vposz_k^j$)=($posx_k^j$, $posz_k^j$)*M.

In step (9), the mobile phone is placed in the virtual reality glasses, and the user can see the three-dimensional scene by the virtual reality glasses. According to the user's head rotation captured by the mobile phone sensor information capturing module, the user position obtained by the virtual-reality position mapping module, the tracking of user's field of view and point of view are tracked to determine the target in the current field of view, and the user's point of view and orientation.

In a typical embodiment of the present application, as FIG. 1 shows, the key equipment required for the present invention includes mobile virtual reality glasses, Kinect sensors, and auxiliary light sources. Users wear virtual reality glasses, and its screen generation and rendering are handled by connected mobile phones. Kinect can map your position and gesture into the virtual world, in order to achieve immersive experience.

Figure 2:
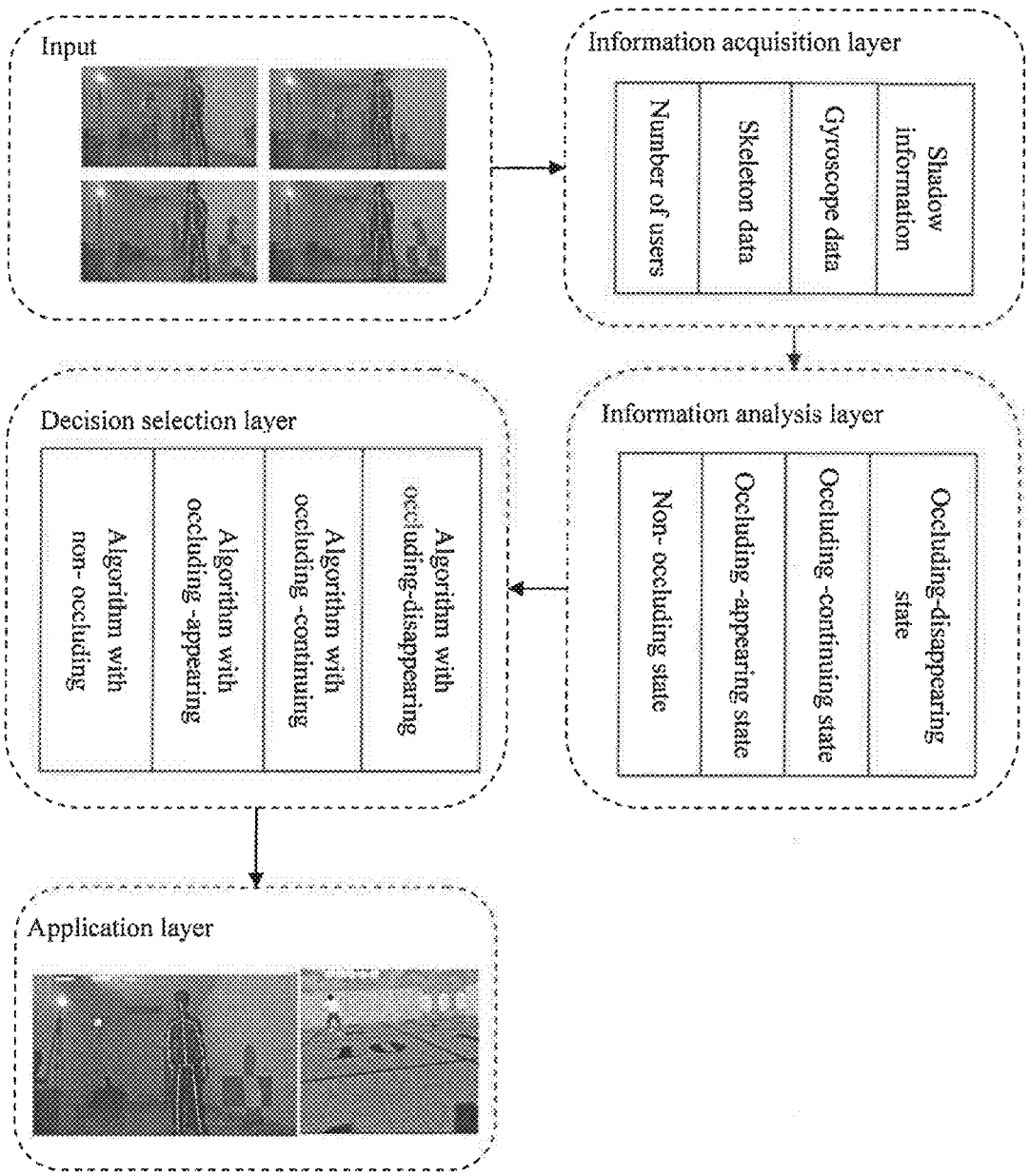
FIG. 2 is a system architecture diagram of the present invention.

As shown in FIG. 2, the present application proposes a single Kinect-based multi-user tracking system which supports mobile virtual reality application, and designs a decision fusion method based on multiple clues to track the position of users occluded in different degrees. The method can be divided into four levels:

The first level, information acquisition layer. According to the input information, acquiring the number of users, user skeletal data, gyroscope data and user shadow information.

The second level, the information analysis layer. Judging the existing state of the system according to the information obtained. The present invention divides the system state into four categories: non-occluding state, the occluding-appearing state, the occluding-continuing state, the occluding-disappearing state.

The third level, the decision-making selection layer is used to design the different tracking methods according to the above-mentioned four kinds of system states, and the different tracking methods are invoked according to the different states of the system.

The fourth level, application layer. Based on the multi-clue decision fusion method, the position calculation of the users who are occluded in different degrees is realized, and the obtained physical coordinates of the user are mapped to the virtual space coordinates to ensure the consistency of the user's real feeling in movement and the image seen in the virtual device.

The method incorporates various types of information, such as mobile phone gyroscope data, color image information, depth image information, to compensate the lack of data caused by occluding.

Figure 3:
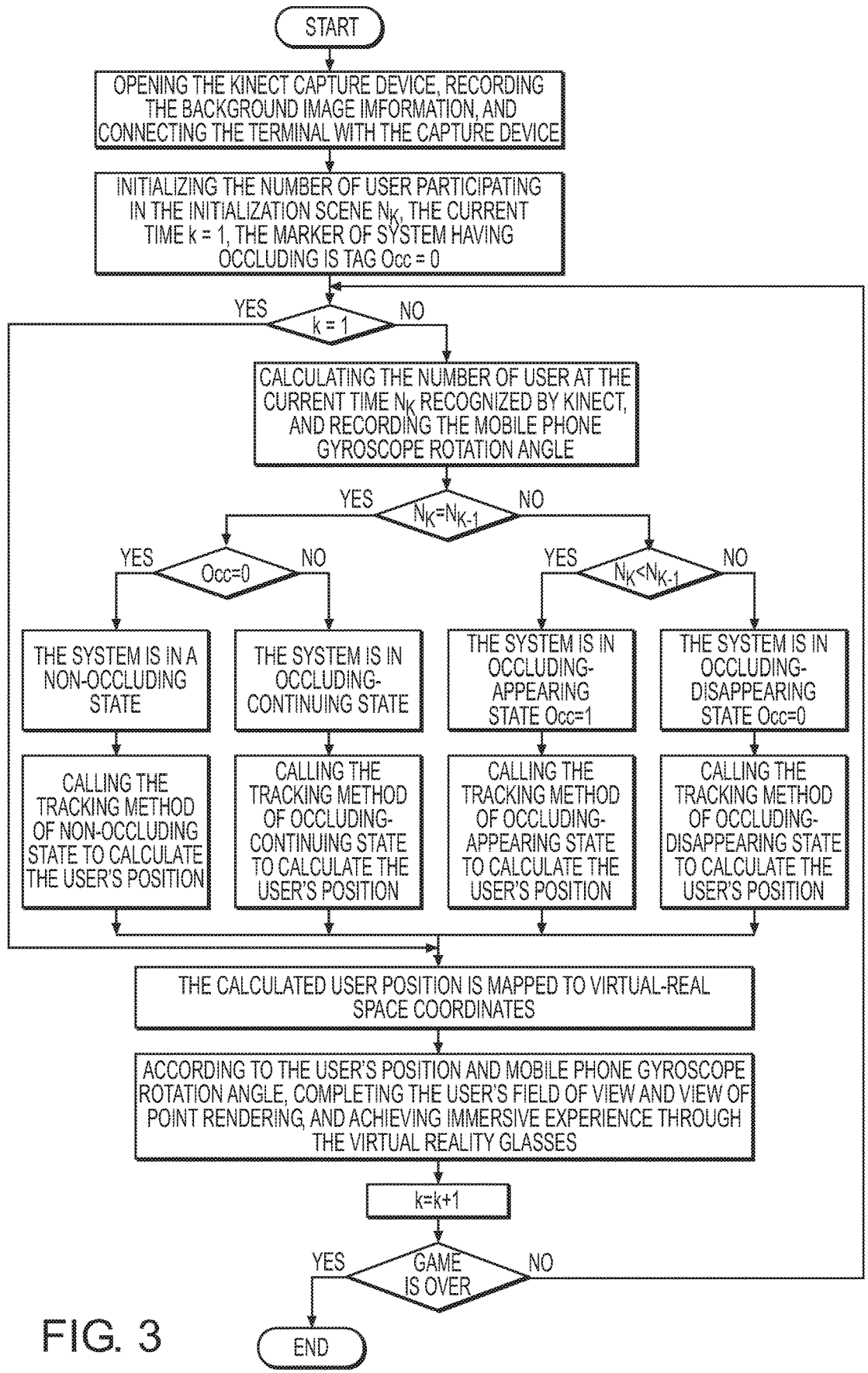
FIG. 3 is a flow chart of the method of the present invention.

As FIG. 3 shows, the operation of the present invention includes the following steps:

(1) opening the Kinect capture device, recording the background image information, and connecting the terminal with the capture device;

(2) assuming that the number of users participating in the initialization scene is $N_k$, the current time k=1, whether or not occluding happens in the system Tag Occ=0;

(3) if k=1, then jumping to step (8), otherwise jumping to step (4);

(4) calculating the number of users $N_k$ that Kinect can identify currently, and recording the rotation angle of the terminal gyroscope;

(5) judging the current state of the system according to the number of users identified at the adjacent time, if $N_k=N_{k-1}$, jumping to step (6), otherwise jumping to step (7);

(6) according to the tag of occluding Occ, judging the state of the system, if Occ=0, then the system is in a non-occluding state, calling the non-occluding method to calculate the user's position, then jumping to step (8); otherwise, the system is in the state of continuous occluding, then calling the continuous occluding state method to calculate the position of the user, and jumping to step (8);

(7) if $N_k<N_{k-1}$, then the system is in the occluding appearing state, calling a occluding-appearing state method to calculate the position of the user and setting Occ=1, jumping to step (8); otherwise the system is in the occluding disappearing state, calling the occluding-disappearing state method to calculate the position of the user and setting Occ=0, jumping to step (8);

(8) mapping the calculated user's position to the virtual space coordinates to ensure the spatial consistency between the real feeling of the user in movement and the image seen in the virtual device;

(9) according to the user's position and the rotation angle of terminal gyroscope got from (8), rendering the user's field of view and viewpoint, and realizing immersive experience through virtual reality glasses;

(10) k=k+1;

(11) determining whether the game is over, if so, finishing the game, otherwise jumping to step (3).

FIG. 4(a) and FIG. 4(b) are examples of the present invention applied to a two-person virtual reality maze game. When the occluding happens, by adopting the present invention, the position of the occluded player can be continuously tracked, to ensure the smoothness and immersive feeling of the player experience. FIG. 4(a) shows the shadow movement of the occluded user, and FIG. 4(b) shows the movement of the user in the virtual scene seen by the user through the virtual reality glasses.

The description above is merely a preferred embodiment of the present application and is not intended to limit the present application. It will be apparent to those skilled in the art that various changes and modifications can be made herein. Any modifications, equivalent substitutions, improvements, and the like made within the spirit and principle of the present application are intended to be included within the protection scope of the present application.

Although the specific embodiments of the present invention have been described with reference to the accompanying drawings, it is not intended to limit the protection scope of the invention. It would be understood by those skilled in the art that various modifications or variations made without any creative effort on the basis of the technical solution of the present invention are within the protection scope of the present invention.

The invention claimed is:

1. A multi-user tracking method for supporting virtual reality applications in which a plurality of users move in a physical space that correspond to one or more virtual spaces in the virtual reality applications, the multi-human tracking method comprising:

(1) recording a background image of the physical space with a single Kinect depth camera;

(2) assuming that a number of users participating in an initialization scene is $N_k$, a current time k=1, and a state of occluding is Occ=0, and acquiring an initial position and an initial orientation of viewpoints of the one or more users in the one or more virtual spaces in the virtual reality applications;

(3) if k=1, then jumping to step (8), otherwise jumping to step (4);

(4) calculating the number of users $N_k$ that the single depth camera identifies in a current image, and recording a rotation angle of each user via a terminal gyroscope worn by each user;

(5) judging a current state of the number of users to determine whether the number of users has decreased by one from a previous state of the number of users such that $N_k=N_{k-1}$, jumping to step (6), otherwise jumping to step (7);

(6) according to a state of occluding Occ, judging a state of a physical space, if Occ=0, then the physical space is in a non-occluding state, calling a non-occluding method to calculate a user's physical position, then jumping to step (8); otherwise, the physical space is in a state of continuous occluding, then calling a continuous occluding state method to calculate a physical position of the user, and jumping to step (8);

(7) if $N_k<N_{k-1}$, then the physical space is in an occluding appearing state, calling an occluding-appearing state method to calculate the physical position of the user and setting Occ=1, jumping to step (8); otherwise the physical space is in an occluding disappearing state, calling an occluding-disappearing state method to calculate the physical position of the user and setting Occ=0, jumping to step (8);

(8) mapping the calculated physical position of the user to the one or more virtual space coordinates for coordinating a spatial consistency between a physical movement of the one or more users and a virtual image viewed by the one or more users;
(9) according to the user's physical position and a rotation angle of terminal gyroscope, determining the user's field of view and viewpoint;
(10) changing the initial position and the initial orientation of the one or more users in the one or more virtual spaces in the virtual reality applications based on the determined position and the determined field of view and viewpoint;
(11) adding one to k;
(12) determining whether a game in a respective virtual reality application is over, otherwise jumping to step (3).

2. The multi-user tracking method according to claim 1, wherein
when the physical space is determined as being in a non-occluding state in step (6), the user position calculation method comprises the following steps:
(6-1) recording the user's physical position information as $P_k=\{p_k^i|i=1, 2, \ldots Nu\}$, and a corresponding user number identification (ID)$UID=\{uID^i|i=1,2, \ldots Nu\}$, where $p_k^i$ represents physical position information of the i-th user at k moment, $uID^i$ represents the ID of the user i, and Nu represents the number of users at a current moment;
(6-2) updating in real time the corresponding user's physical position according to the user number ID of each user such that the ID of the user i is u currently, the position is pos, then $u=uID^j(j=1,2, \ldots Nu)$, then $p_i^j=pos$.

3. The multi-user tracking method according to claim 1, wherein
when the physical space is determined as being in a occluding-continuing state in step (6), the user position calculation method comprises the following steps:
determining an occluded user's position by tracking a movement of a shadow of an occluded user based on skeleton information that is obtained through the single depth camera, and gyroscope sensor data.

4. The multi-user tracking method according to claim 3, further comprising the steps of:
assuming that the occluded user is $p^j$ at time k, and the user blocking $p^j$ $p^i$,
determining a search rectangle area of a shadow of the user $p^j$ based on the physical position of the user $p^i$ obtained by the single depth camera, the position of a light source, and the physical relationship between $p^i$ and $p^j$,
determining a difference between the foot position of the user and the starting position of the shadow search box,
subtracting the real-time color image captured by the single depth camera from the acquired background image to obtain a silhouette of the shadow of the user,
calculating a center position of the shadow based on the obtained silhouette of the shadow of the user,
determining whether a movement direction of the occluded user $p^j$ has changed based on the gyroscope sensor data,
determining whether a physical position of the occluded user $p^j$ has moved based on a change in the shadow position of the adjacent frame, and
determining the occluded user's physical position based on the determined movement direction and the determined physical position.

5. The multi-user tracking method according to claim 4, further comprising the steps of:
changing a size of a search rectangular box in real time based on the physical position of the user $p^j$ and the light source,
determining a difference between a color image captured in real time and a background image obtained by initialization in a shadow search rectangular box,
if the difference is greater than a preset threshold, the generated image is identified as a foreground image, and
if the difference is not greater than the preset threshold, there is no user shadow in the an area of the search rectangular box.

6. The multi-user tracking method according to claim 1, wherein
when the physical space is determined as being in the occluding-appearing state in step (7), the user position calculation method comprises the following steps:
assuming that the user's ID information detected at time k is curID, detecting the user number information set UID at k−1,
searching for the occluded user in the physical space, and
determining the movement direction of the occluded user $p^j$ based on the gyro sensor data, and
calculating the physical position of the occluded user at time k based on the determined movement direction and a motion amplitude.

7. The multi-user tracking method according to claim 1, wherein
when the physical space is determined as being in the occluding-disappearing state in step (7), the user position calculation method comprises performing the following steps:
(7-2-1) selecting a position calculation method according to the user's occluded mark, and if: (i) the user is not occluded, jumping to step (7-2-2), or (ii) the user appears again after the occluding, jumping to step (7-2-3);
(7-2-2) updating in real time the corresponding user's position based on the number of each user information;
(7-2-3) updating the number and position information after the user reappears.

8. The multi-user tracking method according to claim 1, wherein
the mapping of the calculated user's position to virtual space coordinates in step (8), includes the following steps:
(8-1) after positioning the single depth camera, marking a tracking area of the virtual space and measuring four corner positions of the tracking area;
(8-2) based on a position of each four corner points in the virtual space, calculating a transformation matrix M of a space coordinate system relative to a virtual scene coordinate system;
(8-3) at current time k, determining that the position of user j is $(posx_k^j, posz_k^j)$, and that the corresponding position of the user in the virtual scene is $(vposx_k^j, vposz_k^j)=(posx_k^j, posz_k^j)*M$.

9. The multi-user tracking method according to claim 1, wherein
in step (9), a mobile phone is provided in the virtual reality headset, and the virtual reality headset is configured to display a virtual 3D scene, the mobile phone is configured to obtain data of a user's head rotation and data of the user's physical position, and the determination of the user's field of view and viewpoint is made based on the obtained data of the user's head rotation and the obtained data of the user's physical position.

\* \* \* \* \*